F. B. SMITH.
Tailors' Measure.
No. 164,943. Patented June 29, 1875.
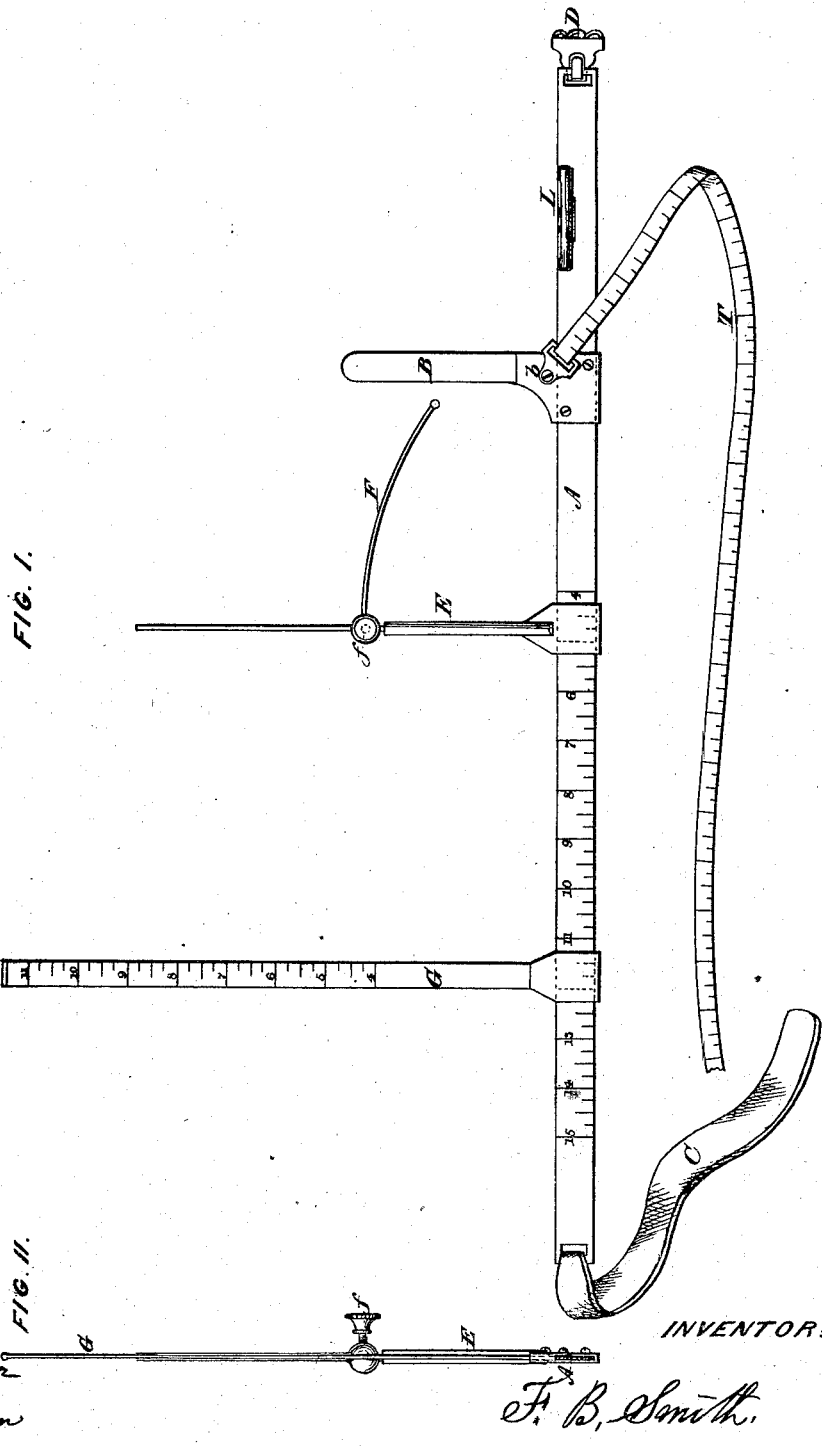
FIG. I.
FIG. II.
WITNESSES:
Jos. A. Keefer
Frank J. Quinn
INVENTOR:
F. B. Smith

UNITED STATES PATENT OFFICE.

FREDERICK B. SMITH, OF WASHINGTON, DISTRICT OF COLUMBIA.

IMPROVEMENT IN TAILORS' MEASURES.

Specification forming part of Letters Patent No. 164,943, dated June 29, 1875; application filed June 2, 1874.

*To all whom it may concern:*

Be it known that I, FREDERICK B. SMITH, of Washington city, in the District of Columbia, have invented certain new and useful Improvements in Tailors' Scales or Measure; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of my invention is to provide a cheap and simple device or scale to guide and assist tailors in taking the measurements for coats, &c.; and it consists in the combination of a flexible blade provided with a strap at one end, and a buckle at the other for securing and holding it in position, and movable adjustable arms or blades, a level and a pivoted tape-measure, all of which will be more definitely described in the following specification.

In the accompanying drawing, Figure 1 is a side or face view of my device; and Fig. 2 is an end view of the same.

In the drawing, A represents a thin flexible blade of steel, or other suitable material, provided at its lower side with a scale of inches, and near one end with a spirit or other suitable level, L, to indicate when the blade is in a horizontal position. This blade is provided with a strap, C, attached to it at one end, and a buckle, D, at the other, by which the device is secured in its proper position to the body. A detachable arm, B, extends out at right angles from the upper edge of the blade, and is firmly held to the blade by screws, when the device is to be used. To this arm a tape-measure, T, of the usual kind is pivoted by a swivel-screw, *b*, so that measurements may be taken in any direction desired. A stiff sliding arm, E, on the blade is provided with a bent arm, F, which is passed over the shoulder, and is held by a thumb-screw, *f*, in any position. Another sliding arm, G, provided with a scale of inches, extending outward is arranged on the blade, and is to be placed in the center of the back.

If it is desired to use the device, the blade A is placed horizontally under the person's arm with the scale end at his back, and the arm E resting against the back of his shoulder, and the bent arm F over the same, and it is secured to his body by the strap C and buckle D. The arm G is arranged on the back, and indicates the height, &c., as well as the distances on the blade in a horizontal direction. The other measurements are then taken in the usual manner by the tape-measure T, and are understood by persons familiar therewith, and it is not necessary to further describe them.

By the use of my device, tailors and others can take the required measurements with great rapidity, ease, and certainty, as they will be far more accurate than when taken by the ordinary tape, and held and adjusted by hand. It can be, also, produced very cheaply and has less parts than any similar device now in use for a like purpose. If it is desired, the device may be made right and left, although one is only necessary.

The object of making all the arms detachable, is that it may be more conveniently carried about from place to place.

I am aware that flexible tailor's scales, provided with adjustable arms, with straps by which to fasten them to the body, and with the tape-measure, are in use, and, therefore, I do not claim, broadly, a scale or measuring device containing any or all of these features; but as my device differs in construction from any now in use, and is simpler, cheaper, and easier to adjust and to take measurements with,

What I claim is—

The tailor's measure, consisting of the flexible blade A provided with level L, and having at ends a suitable strap and buckle, detachable arm B, pivoted tape-line T, graduated arm G, and arm E, with adjustable curved arm F, all constructed and arranged substantially as shown and described.

In testimony that I claim the foregoing as my own, I hereby affix my signature in presence of two witnesses.

F. B. SMITH.

Witnesses:
 JOS. T. K. PLANT,
 B. F. SHANKS.